July 31, 1945.   R. H. SHEPPARD   2,380,615

COMBUSTION CHAMBER

Original Filed Nov. 1, 1941

Inventor
Richard H. Sheppard,
By Henry H. Snelling
His Attorney

Patented July 31, 1945

2,380,615

UNITED STATES PATENT OFFICE 2,380,615

COMBUSTION CHAMBER

Richard H. Sheppard, Hanover, Pa.

Original application November 1, 1941, Serial No. 417,532. Divided and this application April 12, 1943, Serial No. 482,781

7 Claims. (Cl. 123—32)

This invention relates to Diesel engines, and has for its general object the provision of an improved combustion chamber having more efficient turbulence during the injection period.

The primary object of my invention is to provide an arrangement of combustion chamber and cylinder which reduces the amount of solid fuel impinging against the enclosing surfaces thereby improving the combustion by reducing smoldering and resulting carbon deposit. Smoldering, indicated by smoky combustion, is chiefly due to lack of air, at the point of contact with the surfaces, and therefore by increasing the ratio of air to the portion of solid fuel touching the hot surfaces I reduce the smoldering and without changing the ratio of total air to total fuel charge.

A second object of this invention is to increase the power while decreasing the exhaust smoke by adding a third and smaller throat working in opposition to the other two throats. This provides further turbulence in the combustion chamber and more important it prevents fuel from the injector from being swept on to the combustion chamber wall by the main swirl provided by the two large throats.

A third object of the invention is to eliminate or greatly reduce the tremendous pressure exerted by a tightly fitting block tending to force apart the head and block with attendant loss of pressure. This is accomplished by making a portion of the chamber non-rigid so it may compress at operating temperature and expand to full length when cooler.

A specific object is to provide a combustion chamber arrangement whereby a portion of the fuel charge and particularly the larger droplets of fuel occurring at full load are directed into the upper central portion of the cylinder. A further specific object is to provide a combustion chamber in which the fuel charge is insulated from the surface by a layer of revolving air which is turbulent on its descending side.

A still further specific object is to form in the chamber block an outside annular groove and an inside annular groove so that the chamber block or plug may be made exactly the same length as the hole into which it fits, thereby avoiding the building up of carbon deposits as occurs if the block is a few thousandths short to allow for expansion at extreme temperatures.

An important object is to provide a combustion chamber plug to be substituted in existing engines having spherical or cylindrical combustion chambers to increase the efficiency of such engines.

Figure 1:
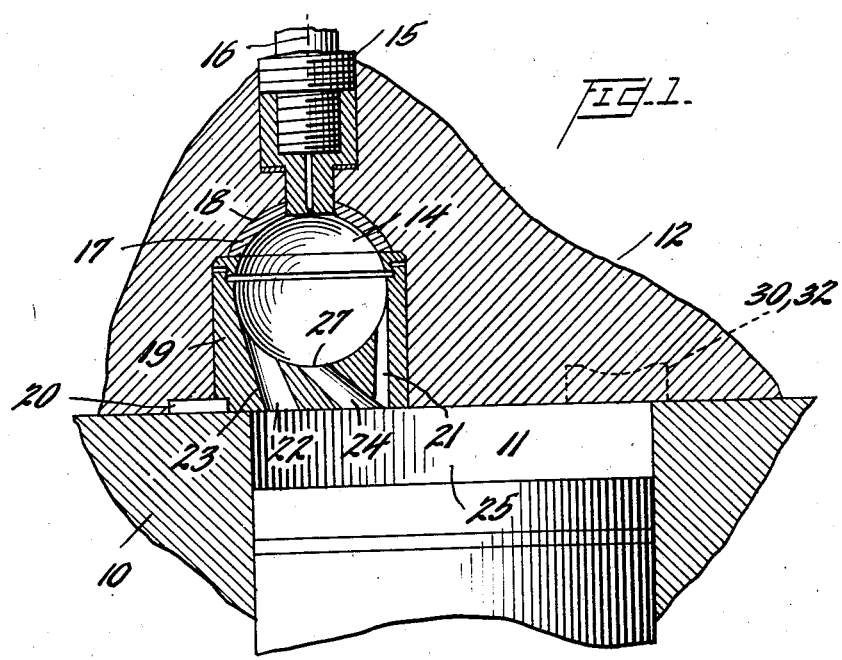
Figure 1 is a vertical sectional view of the upper part of an engine showing the cylinder and combustion chamber.

In Figure 1 the engine block 10 is shown as having a cylinder 11 and cylinder head 12, with a combustion chamber 14 located in the head 12. The combustion chamber is preferably of spherical shape and has at the top a fuel injection nozzle 15 which is adapted to inject a jet of fuel having its axis 16 approximately in the vertical diameter of the chamber.

Figure 2:
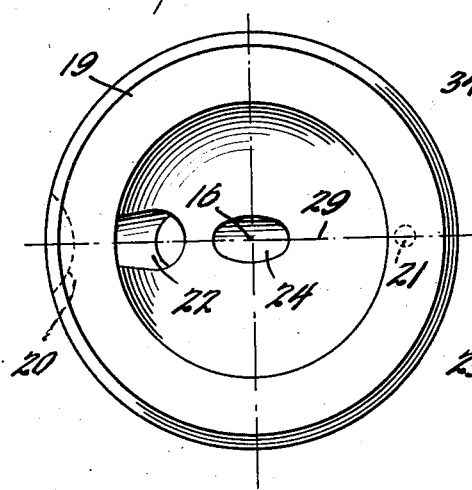
Figure 2 is an enlarged top plan view of the chamber plug.

The upper part of the combustion chamber is formed by the hemispherical termination 17 of the bore 18 in the cylinder head 12 and the lower part is a complementary cavity in the upper face of what may be termed a throat block or plug 19 fitting in the bore and in which it is held by its bottom face being engaged by the top of the cylinder block; a screw 20 on the edge of the plug, as best shown in Figure 2, prevents rotation of the plug from its preferred angular position. Although a spherical chamber is preferred I find that a chamber having circular cross section in planes parallel to the axis of the cylinder is also satisfactory.

Figure 3:
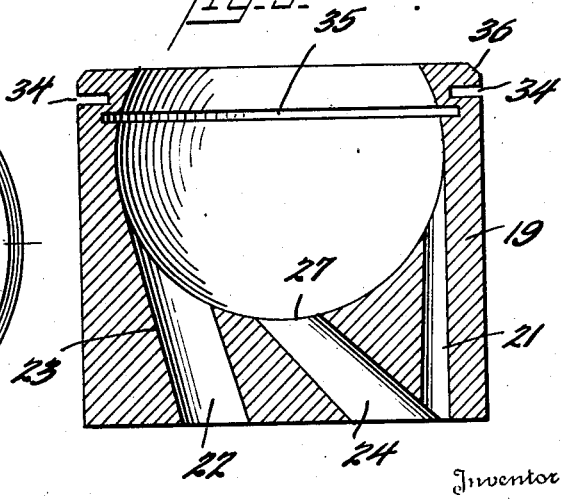
Figure 3 is a central section through Figure 2.

The throat block or plug 19 is provided, in addition to the new third throat 21, with a main throat 22 and an auxiliary throat 24, the outer wall 23 of the main throat being tangential to the surface of the chamber whereby air rushing through will rotate in the chamber about its axis which in the drawing is a horizontal axis. The auxiliary throat 24 is at a slight angle to the tangent of the chamber wall and is positioned to direct the outgoing charge toward the center 25 of the upper part of the cylinder and has its orifice 27 located to receive droplets from the injector nozzle 15, that is, the axis of the fuel jet passes through the orifice 27. The throat 24 is positioned to produce a layer of air within the layer of air created by the air rushing through the main throat 22 into the chamber. Whether the combustion chamber is spherical or is cylindrical in shape the throat block is positioned for best results with the axis of the throat 24 in a radial plane of the cylinder and the third throat 21 and main throat 22 are preferably but not necessarily located with their axes in the same plane whereby the fuel charge is directed toward the center of the cylinder. As shown in Figures 1 and 3, the axis of the third throat is vertical, and the main throat lies at an angle of 72°, and that of the second or auxiliary throat is less steep, lying at an angle of 40°.

The main and auxiliary throats discharge air from the cylinder into the combustion chamber to revolve in the same direction but the smaller third throat opposes this motion and creates turbulence on the right or descending side of the outer air layer.

Under full load, a large percentage of the fuel reaches the opposite side of the combustion chamber and enters the throat 24 without being atomized, so that the out-rushing fuel charge carries, or at least starts, these relatively large droplets directly toward the center of the cylinder, thus producing efficient combustion by reducing to a minimum the amount of solid fuel contacting the enclosing walls. The throat 24 is preferably positioned so that its axis intersects the cylinder axis 25 at a point spaced from the cylinder head a distance not much greater than the length of the throat. The third throat, by opposing deflection of these droplets from the entry end of the second throat, materially aids in the desired avoidance of color in the exhaust discharge.

In the plan view, Figure 2 shows the preferred relative position of the parts. It will be seen that the vertical plane 29 containing the vertical axis 16 of the combustion chamber bisects all three throats and lies between the exhaust valve 30 and the intake valve 32. The chamber with only the main and auxiliary throats is an excellent design but the third throat 21 increases the power and provides a more efficient and quiet combustion as indicated by the decrease in exhaust smoke, which at ordinary loads is substantially invisible, if not actually so.

The grooves 34 and 35 with the slight bevel 36 permit the making of the plug or block of the exact length of the bore 18 which receives it. When a block is made shorter than the length of the bore, the remedy is only a temporary one, because of the building up of carbon deposits, during the starting process, which soon fills the space. By means of the slot or groove 34 cut inward from the outside of the block and the adjacent slot or groove 35 in the combustion chamber itself the block loses its absolute rigidity and may compress in length a few thousandths of an inch without damage to itself or exerting damaging pressure to separate the body and head. Without these grooves the combustion chamber plug, being hoter than the head which surrounds it, expanded a greater amount tending to force apart the cylinder block and its head so that there might be a loss of gases with consequent loss of power. It is important to note that the deformation is temporary as although the compression changes the length of the combustion chamber plug is constant so it is tight in the head when cooled as when the engine is in operation.

The high efficiency of combustion obtained by my engine under all loads is believed to be due to the fact that a minimum of solid fuel touches the hot enclosing surfaces and this for two reasons: first, the air entering the combustion chamber through the throat 22 during compression forms an insulating layer of air between the surface of the chamber and the atomized fuel from the fuel nozzle and the main fuel charge is contained mainly in an inner layer formed by the air entering the chamber through the throat 24, and, second, under full load at which time the fuel feed is maximum, the droplets injected pierce both blankets of rotating air by aid of the turbulence caused by the third throat without being completely atomized and enter the orifice 27 of the throat 24, so that as combustion takes place these relatively large droplets are directed toward the center of the cylinder 11. The rarer portion of the fuel charge is directed by throat 22 into the outer region of the cylinder near the top wall. Thus, we have a combustion charge in the cylinder having a rich center and a rarer outer portion which is contrary to the accepted theory that the mixture of air and fuel should be uniform for maximum efficiency. The efficiency theoretically lost due to the non-uniform mixture of the fuel charge is compensated for by the substantial elimination of improper surface contact burning.

Other theories have been advanced to explain the high efficiency I have obtained but the one given seems to satisfy the different factors present. It is understood, of course, that the layers of air are by no means distinct but it is believed that the layer produced by the throat 22 does prevent a considerable portion of the solid fuel from contacting the chamber surface and the small amount touching the walls has sufficient air to support combustion without smoldering. It is also to be understood that the mixture of air and fuel enveloped in the layer of insulating air in the chamber becomes substantially uniform before ignition and that the richer mixture in the throat 24 is chiefly due to the presence of the larger droplets, at full load, injected directly into the throat.

This application is a division of my copending case, Serial 417,532, filed November 1, 1941, which has now become Patent No. 2,324,328.

What I claim is:

1. In an internal combustion engine of the liquid fuel injection type, a cylinder, a combustion chamber having a circular cross-section, a fuel jet nozzle positioned to inject a jet of fuel through the center of the chamber, and means having a main and a plurality of auxiliary throats providing communication between the cylinder and chamber, the main throat having one wall tangential to the wall of the chamber, one auxiliary throat having its axis intersecting the axis of the cylinder and the axis of the fuel jet, and the other having one wall tangent to the wall of the chamber opposite the point at which the main throat wall is tangential to the cylinder wall, the axis of the fuel jet passing through the nearer orifice of said one auxiliary throat, whereby droplets of fuel thrown into said auxiliary throat are carried directly to the center of the cylinder, such action being aided by turbulence caused by said other auxiliary throat.

2. In an internal combustion engine of the compression ignition type, a cylinder block having a cylinder bore, a cylinder head having a cavity therein shaped at one end with a partial surface of revolution, a throat block in said cavity having a complementary partial surface of revolution registering with the first mentioned surface to form a combustion chamber, a fuel jet nozzle positioned to inject a jet of fuel into the combustion chamber and toward said throat block, said throat block having a throat directed toward the surface of the chamber at the junction of the throat and chamber to create a rotating layer of air in the chamber adjacent said surfaces, a second throat directed inward of said junction to create a second layer of rotating air in said chamber near the center, and a third throat opposing said first two throats to increase turbulence, said third throat being directed toward the surface of the chamber at the junction of the third throat and the chamber, roughly diametrically opposite the junction of the first mentioned throat and the chamber, the axes of the first throat and the third throat making an angle between them of but a few degrees.

3. In an internal combustion engine of the liquid fuel injection compression ignition type, the combination with an engine cylinder, of a combustion chamber outside of but communicating with the cylinder, said chamber being circular in cross section with respect to planes parallel to the axis of the cylinder and normal to a horizontal axis through the chamber, a throat block having three throats providing communication between the cylinder and chamber, one throat being positioned to create a layer of air adjacent the inner surface of the chamber about said axis, a second throat being positioned to create a second layer of air within said first layer and the axis of said second throat intersecting the axis of the cylinder, the third throat being nearly parallel with the first throat and having its chamber orifice roughly diametrically opposite the chamber orifice of the first throat, so that the air jet thru the third throat will oppose the rotation of said air layers, and a fuel injection device positioned to inject a jet of fuel across a substantial width of said chamber and having the axis of the fuel jet intersecting the orifice of the second throat whereby fuel droplets travelling across the chamber enter the second throat and are directed toward the center of the cylinder.

4. The device of claim 3 in which the cylinder axis is vertical, the axes of the throats lie in a plane through the center of the cylinder, and the second throat opens at the lowest point of the chamber.

5. In an internal combustion engine of the compression ignition type having a cylinder bore, means providing a spherical combustion chamber and main and auxiliary passageways between the chamber and cylinder, and a fuel injection nozzle positioned to inject a jet of fuel diametrically across the chamber into one of the auxiliary passageways, said passageways being substantially straight and having their axes in a radial plane of the cylinder, and the axis of the jet produced by the nozzle lying in said plane, the central axis of the auxiliary passageway intersecting the cylinder axis at a point positioned from the top of the cylinder a distance substantially equal to the length of the throat, and another of the auxiliary passageways being of lesser diameter than the other passageways and having its axis parallel to the axis of the injection nozzle, and being located roughly diametrically opposite the main passageway, whereby the air jets thru these two passageways will create turbulence.

6. In a Diesel engine a cylinder, a combustion chamber, an injection device discharging into said chamber, and a plurality of throats connecting said chamber and cylinder, one of the throats discharging air tangentially into the cylinder to one side of the fuel jet from the injection device, and a second one of said throats having a fuel receiving opening in line with the discharge of the injection device, a third throat, smaller than either of the others, discharging air tangentially into the cylinder to the other side of the fuel jet, the axis of the second throat intersecting the axis of the cylinder and intersecting the axis of the first throat at a small angle to discharge air from the cylinder into the chamber tangentially of the air stream from said one throat, so that both air streams will rotate together.

7. The device of claim 6 in which the surfaces of the throats are conical, and their axes make angles of about 72°, 40°, and 90° respectively with a plane normal to the axis of the cylinder.

RICHARD H. SHEPPARD.